United States Patent [19]
Holsinger

[11] Patent Number: 4,872,104
[45] Date of Patent: Oct. 3, 1989

[54] WINDUP PREVENTION SYSTEM FOR A CONTROL LOOP TO PREVENT OVERSHOOT

[75] Inventor: Kevin Holsinger, Menlo Park, Calif.

[73] Assignee: Spectra Physics, San Jose, Calif.

[21] Appl. No.: 181,429

[22] Filed: Apr. 14, 1988

[51] Int. Cl.⁴ ............................................. G05B 11/36
[52] U.S. Cl. ...................... 364/166; 364/161; 364/162; 364/176; 364/153; 318/610; 318/616
[58] Field of Search .......... 364/153, 160–162, 364/166, 176; 318/610, 616

[56] References Cited
U.S. PATENT DOCUMENTS

| | | | |
|---|---|---|---|
| 3,819,999 | 6/1974 | Platt | 318/609 |
| 3,938,017 | 2/1976 | Hayes | 318/610 |
| 4,749,928 | 6/1988 | Dautremay et al. | 318/610 |

Primary Examiner—Jerry Smith
Assistant Examiner—James J. Kulbaski

[57] ABSTRACT

An apparatus and method for eliminating integrator windup in control systems having a control input, a feedback signal and an actuator that can saturate in response to dynamic non linearities such as slew rate limits. The apparatus of the invention is comprised of circuitry that determines the rate of change of the output of the integrator and compares it to predetermined maximum allowable rates of change. If these maximum allowable rates of change have been exceeded, the comparator circuitry generates a compensation error signal which when combined with normal error signal integrated by the compensator tends to reduce the rate of change on the output of the integrator.

19 Claims, 8 Drawing Sheets

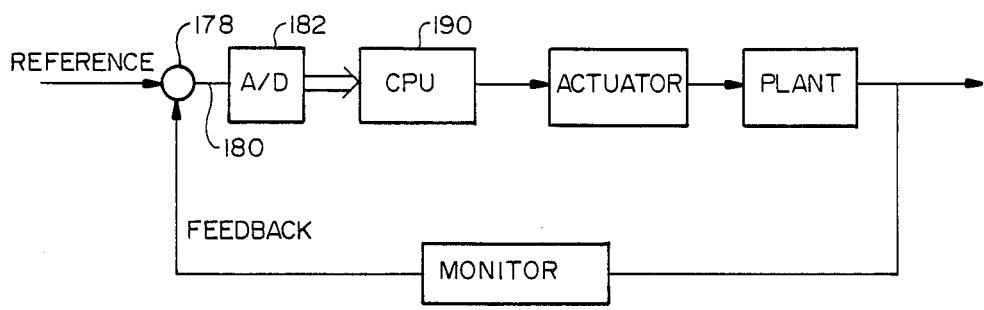
FIG. II

WINDUP PREVENTION SYSTEM FOR A CONTROL LOOP TO PREVENT OVERSHOOT

BACKGROUND OF THE INVENTION

The invention relates to the field of control systems, in general, and more particularly, to the field of anti-windup systems for control systems having a nonlinearity in the system between the command input and the system output.

It is commonly found in control systems that a phenomenon known as integrator windup may occur if compensators having integrators are used with actuators which have limited dynamic range. A typical control system will have a command input which receives a command signal which is summed with a feedback signal to create an error signal. This error signal is applied to the input of a compensator which usually has an integrator therein to smooth out instantaneous changes in the error signal. The output of the compensator is typically applied to the input of an actuator conversion device which converts the integrated error signal to another signal suitable for controlling the device being controlled. Integrator windup typically occurs when a large command input suddenly occurs which causes the actuator to saturate. Saturation of the actuator occurs when the output of the actuator can no longer increase or decrease with increasing or decreasing actuator input. Such saturation can result from either static or dynamic nonlinearities.

An example of a static nonlinearity is a variable power supply which can supply a maximum of 40 amps and a minimum of 10 amps in response to a command input. If a command input of 4 volts corresponds to an output of 40 amperes and a command input of 1 volt corresponds to an output of 10 amperes, then saturation occurs when the command input reaches and exceeds 4 volts. Even though the command input may be increasing to, for example, 5 or 6 volts, the output of the power supply cannot increase and remains constant at 40 amps.

An example of a dynamic nonlinearity is a slew rate limit. For example, if the output of an operational amplifier can only change 10 milliamperes per second for an input voltage which is changing 1 millivolt per second, saturation by slew rate limiting occurs when the input is changing at a rate faster than 1 millivolt per second. In other words, even though the input may be changing at 2 millivolts per second, the output is only changing at the maximum slew rate of 10 milliamperes per second.

The problem of integrator windup therefore is endemic to many different types of control systems using many different types of actuators involving both static and dynamic nonlinearities.

When saturation occurs, the output of the plant may not have reached the desired level commanded by the command input. As a result, a non-zero error signal will exist which will cause the output of the compensator to continue to change. However, even though the compensator output is still changing, no further change in the actuator output will result because the actuator has saturated. Since the integrator in the compensator keeps integrating the non-zero error signal, the output of the compensator continues to grow. However, the input to the plant is still at its maximum value, and therefore the error signal remains large. Thus, the increase in the output of the compensator is not helping anything, since the input to the plant is not changing.

The integrator output may be quite large if saturation lasts a long time. It takes considerable control effort to bring the output of the integrator back down to a reasonable value for subsequent operations. The result is that the plant output overshoots the desired level and remains at too high a level during the time it takes for the system to settle out and come out of saturation.

This overshoot is undesirable for most, if not all applications. Accordingly, a need has arisen for a control system which can adjust the error signal in such a way that overshoot and extended saturation does not occur.

SUMMARY OF THE INVENTION

According to the teachings of the invention there is disclosed herein an apparatus and method for altering the error signal by combining same with an additional "compensation error signal" generated by special rate of change sensing circuitry such that the output of the compensator never asks for a rate of change at the plant output which exceeds the ability for that plant output to change. Stated another way, at least in one embodiment, the apparatus of the invention senses the rate of change at the output of the compensator and sends an additional error signal to the input of the integrator to force the output of the plant not to exceed the plant's slew rate limit. This prevents the integrator from winding up thereby preventing output overshoot.

The method of the invention is to sense when the rate of change of the output of the compensator is larger than a predetermined level and to generate an appropriate error signal to slow down the rate of change of the output of the integrator in the compensator. This additional compensation error signal is fed to a summing junction where it is summed with the error signal generated by combining the command signal from the command input with the feedback signal from the plant output. Thus, when there is a large positive-going change in the output of the compensator, the apparatus of the invention generates a compensation error signal having a magnitude and polarity such that when the compensation error signal is summed with the error signal from the command and feedback signals, a composite error signal results at the input of the compensator which tends to reduce the large positive rate of change at the output of the compensator to a smaller value which will not cause windup.

The inverse happens for large negative rates of change at the output of the compensator.

The apparatus and method of the invention tends to prevent the compensator from asking for a rate of change at the output of the plant which cannot be achieved because of dynamic nonlinearities such as slew rate limitations. Fundamentally, the teachings of the invention can be applied to any control system wherein a dynamic nonlinearity exists. The basic concept of the invention is to examine the output of the compensator to determine when it is pushing the plant into a nonlinear region. Appropriate action is then taken to alter the output of the compensator to avoid entering the nonlinear region thereby preventing windup.

In the preferred analog embodiment, a differentiator in the form of an operational amplifier has its input coupled to the output of the compensator, i.e., the integrator. The differentiator generates a pulse having a magnitude equal to the rate of change. The polarity of the differentiator is such that positive-going rates of change generate negative-going pulses and negative-going rates of change generate positive pulses. These pulses are applied to the inputs of a pair of operational amplifiers which serve as comparators. These operational amplifiers have their differential inputs coupled to ground and offset voltages as well as to the output of the differentiator. The magnitudes of the pulses, i.e., the rate of change of the output of the compensator, are compared to maximum allowable rates of change in both the positive and the negative direction as represented by the offset voltages. When the rates of change exceed the maximum allowable rates of change, these operational amplifiers generate signals of the appropriate polarity which are coupled through a diode and resistor network to a summing junction. This summing junction has as its other inputs, the command signal and the feedback signal from the output of the plant. The output of the summing junction is the composite error signal which is integrated by the compensator.

Those skilled in the art will appreciate how the above described apparatus could be implemented in digital form. In such an embodiment, sampling of the compensator output would be done periodically with comparisons between adjacent samples to calculate the difference in magnitude between the samples. The difference so calculated is indicative of the rate of change at the output of the integrator. Each difference number would be compared to constants indicating the maximum allowable rates of change in the positive-going and negative-going directions. If this comparison yielded the conclusion that the rates of change at the output of the compensator were less than the maximum allowable rates of change, then nothing further would be done. However, if the conclusion were that the rate of change at the output of the compensator exceeded the maximum allowable rate of change, then appropriate action would be taken to digitally alter the error signal or otherwise digitally reduce the rate of change at the output of the compensator. In an all digital environment where the compensator is also digital, it is simple to limit the output slew rate of the compensator directly, without the additional feedback signal.

BRIEF DESCRIPTION OF THE DRAWINGS

FIG. 11 is block diagram of a hybrid analog/digital system to implement the teachings of the invention.

DETAILED DESCRIPTION OF THE PREFERRED EMBODIMENT

Figure 1:
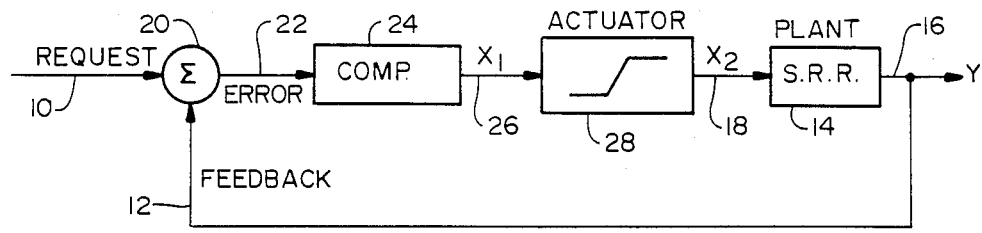
FIG. 1 is a block diagram of a typical prior art control system used to illustrate the problem.

Referring to FIG. 1 there is shown a block diagram of a typical prior art control system having an actuator which can saturate. In FIG. 1, the request or command input arrives on signal line 10. A feedback signal on line 12 indicates the magnitude of the output of the plant 14. In the specific example chosen for illustration, a switched resistor regulator which generates an output current on output line 16 which is proportional to a duty cycle command on line 18 is chosen as the plant. Typically a current sensor (not shown) would couple line 12 to line 16 such that a feedback voltage on line 12 would be generated which was proportional to the current flowing in line 16.

The request signal on line 10 and the feedback signal on line 12 are summed by a summer 20. The output of the summer is the error signal on line 22 and is coupled to the input of a compensator 24. The compensator 24 includes an integrator which smooths out the instantaneous fluctuations in the error signal on line 22 and generates an output signal $X_1$ on line 26. As long as the error signal on line 22 is positive and non-zero, the signal $X_1$ will continue to grow. If the error signal on line 22 is negative and non-zero, the signal $X_1$ will continue to decrease.

The signal $X_1$ is applied to the input of an actuator 28. The purpose of this actuator is to convert the request signal $X_1$ to the proper form of signal to drive the plant. The output of the actuator is a signal $X_2$ on line 18. In the case where the plant 14 is a switched resistor regulator, the signal $X_2$ takes the form of a duty cycle control signal which controls the on time and off time of the switch in the switched resistor regulator.

Figure 2:
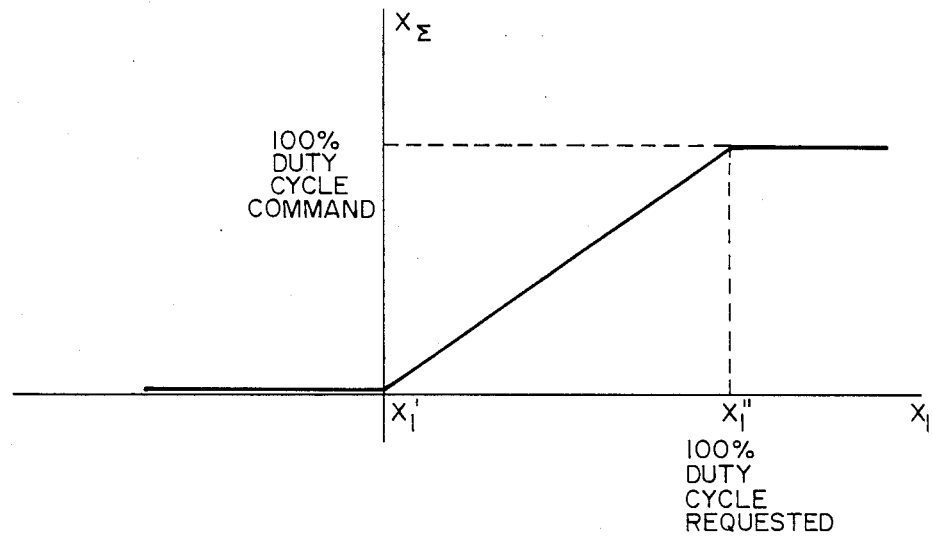
FIG. 2 is a graph of the transfer function of the actuator of the control system of FIG. 1.

The actuator 28 has a transfer function for the value of the signal $X_2$ as a function of the value of the signal $X_1$. This transfer function is nonlinear and is shown in FIG. 2. It will be noted from a study of FIG. 2 that for values of $X_1$ less than or equal to $X_1'$, the value of $X_2$ will be equal and at or near zero. In other embodiments, for values of $X_1$ equal to or less than the value of $X_1'$, $X_2$ may have some other constant level other than zero. For values of $X_1$ between $X_1'$ and $X_1''$, the value of $X_2$ linearly increases with increasing $X_1$. With the value of $X_1$ equal to $X_1''$, the value of $X_2$ causes the switched resistor regulator 14 to have a 100% duty cycle. For values of $X_1$ greater than the value of $X_1''$, saturation has occurred wherein increases in the value of $X_1$ do not result in any increases in the value of $X_2$.

Figure 3:
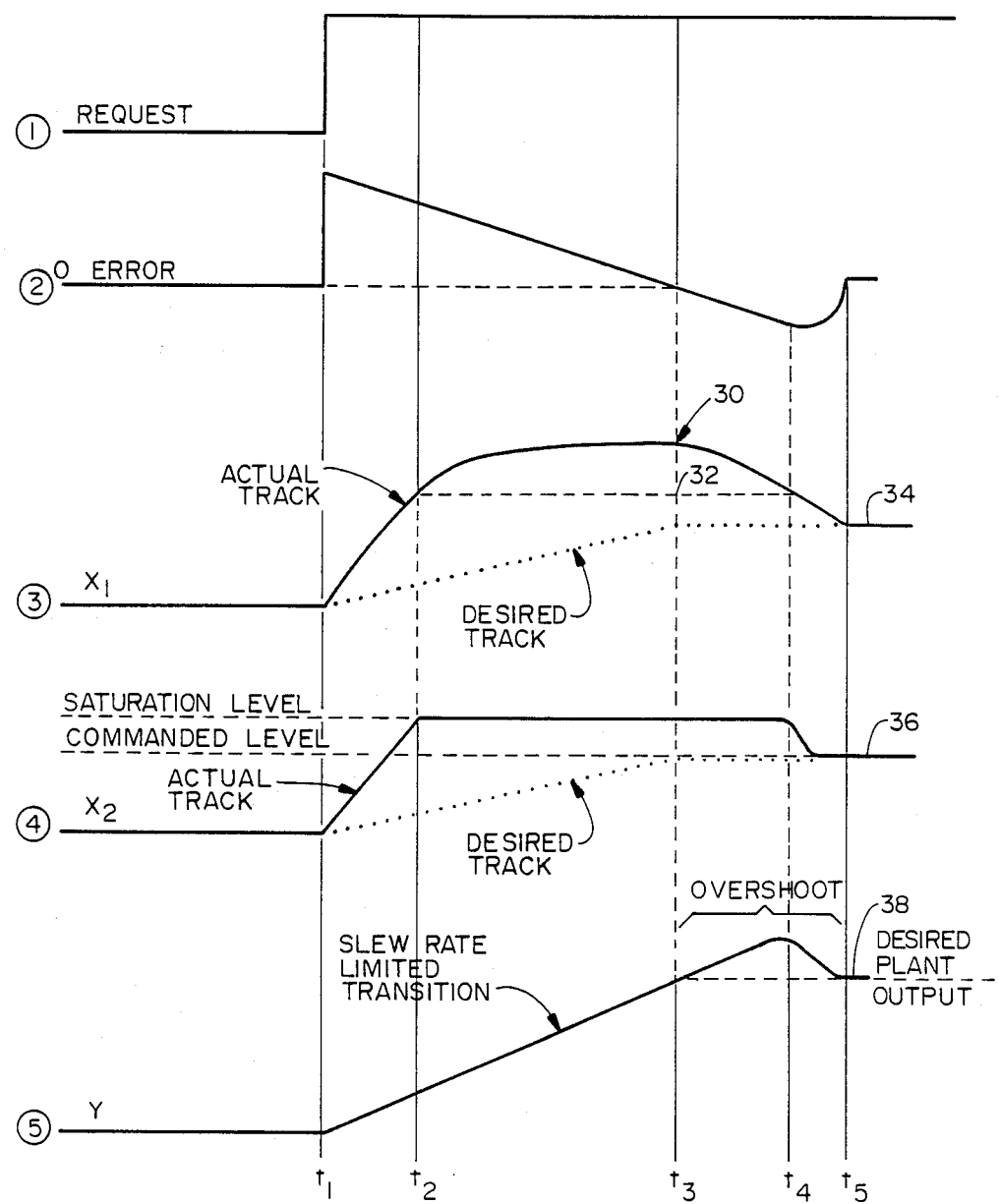
FIG. 3 is a collection of curves which illustrate the windup problem that can result in prior art control systems such as that shown in FIG. 1.

The overshoot problem that will be caused by saturation of the actuator 28 is illustrated in the timing diagrams of FIG. 3. Time line 1 in FIG. 3 illustrates a typical step change in the request signal on line 10. Time line 2 shows the resulting error signal on line 22 for the step change in the request signal on time line 1. Time line 3 illustrates the changes in the signal $X_1$ on line 26 in response to the request signal shown on time line 1. Time line 4 shows the resulting saturation of the signal $X_2$ on line 18 in response to the step change in the request signal on line 1. Time line 5 shows the output of the plant 14 on line 16 in response to the step change request on line 1. At time $T_1$, the request signal makes a large step change requesting an increase in the output level of the Y signal on line 16. Since the Y signal is still at the level shown on time line 5 prior to time $T_1$, the error signal on line 22 jumps to a high positive value at time $T_1$. When the error signal jumps to a positive value, the integrator in the compensator 24 begins to integrate it thereby causing the signal $X_1$ to begin to increase. The rate of increase will be quite large at first since the error signal is positive and large. For purposes of illustration assume that $X_1'$ in FIG. 2 is at zero. This means that as soon as the value of the signal $X_1$ becomes positive and non-zero, the actuator 28 in FIG. 1 causes the value of the signal $X_2$ to begin to increase in accordance with the transfer function shown in FIG. 2. As the value of the signal $X_2$ increases, the magnitude of the plant output signal Y on line 16 also begins to increase as shown at time line 5. The increase in Y causes the feedback signal on line 12 to be combined with the request signal (sometimes herein called the command signal) by the summer 20 to reduce the error signal 22. This is indicated on time line 2 by the decreasing value of the error signal for time equal to or greater than time $t_1$.

The decreasing value of the error signal causes the rate of increase of the signal $X_1$ to decrease as seen by the slight curvature of the actual track for the signal $X_1$ for times greater than $t_1$.

At time $t_2$ the value of the signal $X_1$ has reached the value $X_1''$ thereby saturating the actuator 28. Note that at this time $t_2$, the error signal is still positive and non-zero, so the signal $X_1$ will continue to increase as shown for times greater than $t_2$. However, these further increases of the signal $X_1$ do not lead to further increases in the signal $X_2$ since the actuator 28 is saturated. Therefore, for times equal to and greater than $t_2$ for a predetermined interval, the signal $X_2$ remains constant at the saturation level.

Note that at the time $t_2$ the output of the plant Y has not yet reached a desired plant output level requested by the request signal on time line 1. This is why the error signal on time line 2 is positive and nonzero at time $t_2$.

Since the signal $X_2$ is commanding 100% duty cycle, the output of the plant will continue to rise for times greater than $t_2$ as shown on time line 5. This causes the error signal to continue to decrease. At time $t_3$, the plant output Y reaches the desired plant output level and the error signal reaches zero. At this point with zero error signal, the signal $X_1$ stops increasing and is at a level shown at 30 which is greater than the level 32 needed to saturate the signal $X_2$. In other words, when the signal $X_1$ reaches the level 32, the signal $X_2$ will have just reached the saturation level. Further increases in the signal $X_1$ over the maximum level thereof needed to saturate the actuator are the source of the integrator windup problem in the prior art.

It will be noted from a study of the portions of the curves for the signals $X_1$, $X_2$ and Y for the time interval after time $t_3$ that the signal $X_1$ must be decreased to the level shown at 34 and the signal $X_2$ decreased to the level shown at 36 below the saturation level to get the output from the plant Y to assume the commanded level as shown at 38. To get the signal $X_2$ to decrease from the saturation level to the commanded level at 36 it is necessary to decrease the signal $X_1$ from the level 30 through the level 32 to the level 34. This takes some time to do and the overshoot occurs during this time interval. Because at time $t_3$, the signal $X_2$ is still requesting 100% duty cycle, plant output Y continues to increase at times greater than time $t_3$ but less than or equal to time $t_4$. This continued increase for the signal Y causes the error signal to go negative and continue to increase in the negative direction until time $t_4$. Because the error signal is negative from times $t_3$ to $t_4$, the integrator in the compensator starts to decrease the value of the signal $X_1$. However, during the time between times $t_3$ and $t_4$, signal $X_1$ is still larger than the value needed to saturate the actuator, i.e., level 32, therefore there is no change between times $t_3$ and $t_4$ of the signal $X_2$. At time $t_4$ however, the signal $X_1$ begins to decrease below the level needed to saturate the actuator. This reduces the value of the signal $X_2$ beginning at time $t_4$. Reduction in the requested duty cycle represented by the signal $X_2$ translates to a reduction in the plant output signal Y starting at time $t_4$. This change in direction of the signal Y causes a like change in direction back toward a zero error signal as shown at time $t_4$ on time line 2. When the signal $X_1$ reaches its final level at 34, the signal $X_2$ will reach its level at 36 which is the appropriate level to cause the plant output Y to assume the desired level thereby creating a zero error signal and no further changes in the system until the level of the request on time line 1 changes.

It is desirable to eliminate the overshoot shown on time line 5 of FIG. 3 between times $t_3$ and $t_5$ when the system stabilizes at the desired level of operation.

Figure 4:
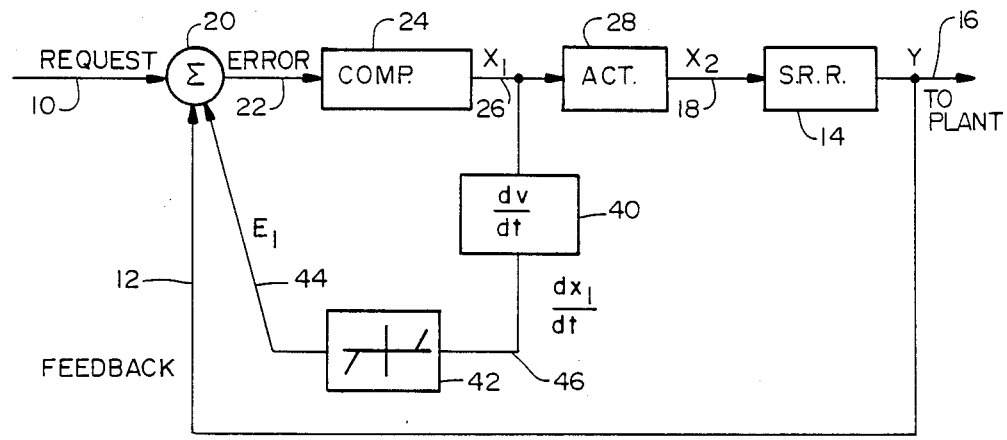
FIG. 4 is a block diagram of the apparatus of the invention.

The preferred embodiment of an apparatus to solve the problem of integrator windup is shown in FIG. 4. In FIG. 4, circuit elements and signal lines having the same reference numbers as circuit elements and signal lines in FIG. 1 serve identical functions as the like numbered circuit elements and signal lines in FIG. 1.

The difference of the structure of FIG. 4 over that shown in FIG. 1 is the addition of an extra feedback loop comprised of a differentiator 40 and a comparator 42. The purpose for this pair of circuit elements is to determine the rate of change in voltage of the signal $X_1$ on line 26 and compare this rate of change to fixed constants indicating the maximum allowable rate of change in both the positive and the negative direction. If the rate of change exceeds the maximum allowable rate of change in either direction, an additional error signal $E_1$ is generated on line 44. This error signal $E_1$ is coupled to the summer 20 and is summed with the magnitude of the request signal on line 10 and the feedback signal on line 12 to modify the magnitude of the error signal 22.

The reader may ask, why compare the rate of change of the signal $X_2$ to fixed constants indicating the maximum allowable rates of change in the positive and negative directions for purposes of making the correction?. Would it not be easier to simply detect when saturation in the actuator occurs and takes steps to remedy this situation. While this is true that it would be easier, in many applications it is not possible to directly observe conditions in the actuator to determine when it is saturated. In such applications, the teachings of the invention are to determine this fact circumstantially by comparing rates of change of $X_2$ to fixed constants. In those applications where it is possible to directly observe the saturation event in the actuator, the teachings of the prior art include prior art systems to detect such saturation or impending saturation directly and to take appropriate steps to circumvent same. Accordingly, it is not within the scope of the teachings of the invention to directly detect saturation by monitoring the signal $X_2$ for saturation effects. Instead, comparison of rates of change to fixed maximum allowable rates of change in both the positive and negative direction is used. These two maximum allowable rates of change may be different.

The differentiator 40 may be either analog or digital and has its input coupled to the line 26. The differentiator determines the rate of change of the voltage on the line 26 and outputs a signal on the line 46 which has a magnitude proportional to the rate of change. The signal on line 46 is input to the comparator 42.

Figure 5:
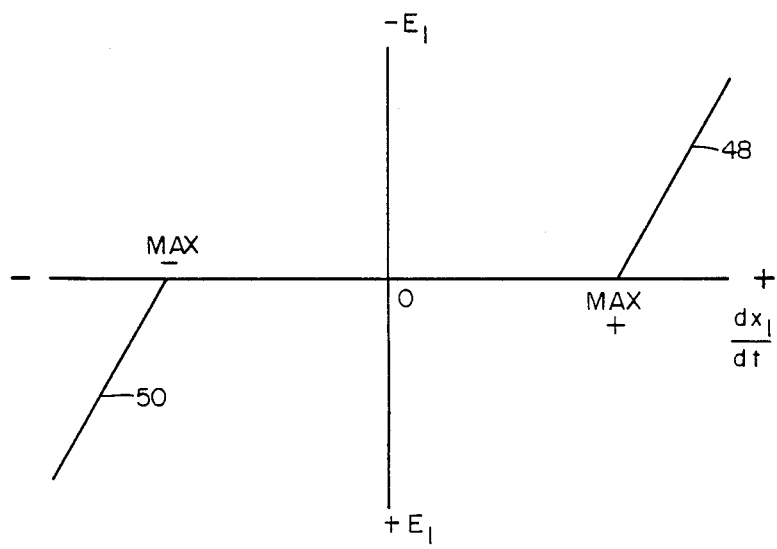
FIG. 5 is a diagram of the transfer function of the comparator in the apparatus of FIG. 4.

The purpose of the comparator 42 is to implement the transfer function shown in FIG. 5. It will be noted from study of FIG. 5 that the value of the error signal $E_1$ is zero as long as the value of the signal $dX_1/dt$ lies between the points on the horizontal axis labeled "max +" and "max −". These two points represent the maximum positive-going rate of change which is acceptable without generation of any error signal component $E_1$ and the maximum negative-going rate of change for the signal on line 26 without generation of an error signal component $E_1$. As the magnitude of the signal on line 46 becomes more positive than the max-plus level, the comparator 42 generates an error signal component $E_1$ which starts to become negative linearly with increasing positive values of the signal on line 46. Likewise, when the signal on line 46 reaches the max-minus level and increases further in the negative direction, the comparator 42 generates the error signal component $E_1$ which increases in the positive direction linearly with increasing magnitude of the signal on line 46.

Note that the slope of the two line segments 48 and 40 are different as depicted in FIG. 5. However, they need not be different. The difference in the slopes of these two line segments indicates that the plant 14 has different slew rates in the positive-going and the negative-going direction, and therefore different compensation through the error signal component $E_1$ is used when correcting for a positive slew rate limit dynamic non linearity and a different negative slew rate limit dynamic non linearity. When the signal $X_1$ has a positive-going rate of change which exceeds the max-plus limit, the signal $E_1$ becomes non-zero and negative. When summed with the request signal on line 10 and the feedback signal on line 12, this tends to reduce the error signal 22 thereby causing the integrator and the compensator 24 to reduce the rate of change of the signal $X_1$. The inverse happens when the negative-going rate of change of the $X_1$ exceeds the negative limit max minus.

Figure 6:
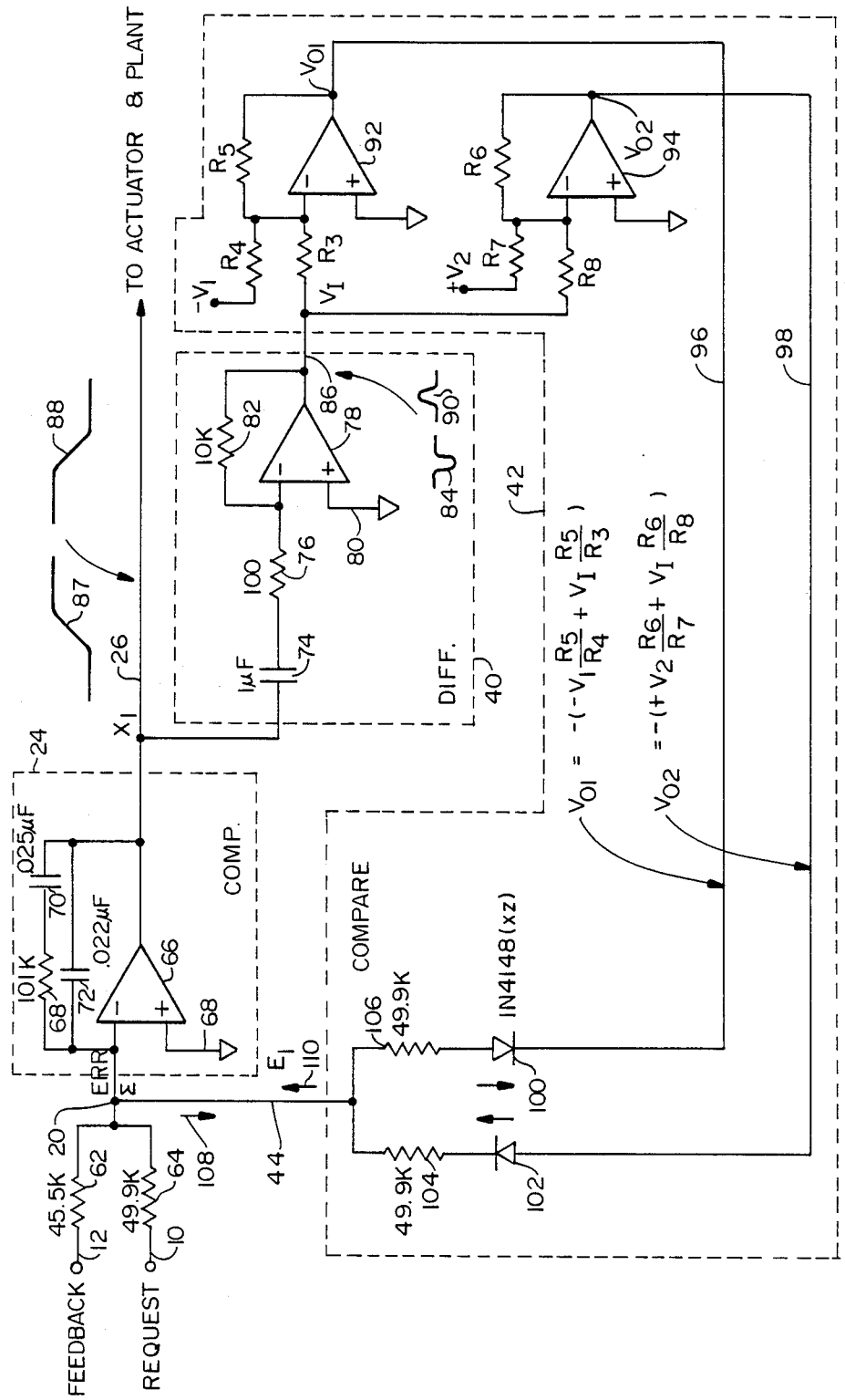
FIG. 6 is a schematic diagram of the preferred analog embodiment of the invention.

An analog embodiment of the system shown in FIG. 4 is detailed in FIG. 6.

In FIG. 6, the feedback signal on line 12 is applied to the summing junction 20 through a resistor 62. Likewise, the request signal on line 10 is applied to the summing junction through a resistor 64. Since the summing junction is connected to the inverting input of the differential input amplifier 66, the summing junction 20 is at a virtual ground potential. Therefore, the resistors 62 and 64 serve to set the relative gain applied to the feedback and request signals on lines 12 and 10, respectively, by virtue of controlling the amount of current that is fed into the summing junction node 20.

The summing junction 20 is also connected to the compensation error signal $E_1$ in line 44. The generation of the compensation error signal will be described in more detail below.

The summing junction 20 is coupled to the inverting input of a differential input amplifier 66 which has its noninverting input coupled to ground via the line 68. The differential input amplifier has a feedback impedance comprised of the resistor 68, the capacitor 70, and the capacitor 72. This feedback network converts the differential input amplifier 66 into an integrator. The composite circuit of differential amplifier plus the feedback impedance comprises the compensator 24. The output signal $X_1$ of the compensator on line 26 is coupled to the actuator and plant (not shown).

The signal $X_1$ is also coupled to the input of a differentiator 40. This differentiator is comprised of a capacitor 74 and a resistor 76 coupling the signal $X_1$ to the inverting input of a differential input amplifier 78. The noninverting input of this differential input amplifier is coupled to ground by the line 80. A feedback resistor 82 sets the gain of the differentiator. Because the signal $X_1$ is coupled into the inverting input of the amplifier 78, positive-going rates of change of the signal $X_1$ such as that shown at 87 are converted to a negative-going pulse such as that shown at 84 on line 86. Likewise, negative-going changes of the signal $X_1$ such as that shown at 88 are converted to positive-going pulses such as that shown at 90 by the differentiator 40 and are output on the line 86. The magnitude of the pulses 84 and 90 represent the maximum rate of change of the signal $X_1$ in the positive-going and negative-going directions, respectively.

The magnitudes of the rates of change of the signal $X_1$ are compared to maximum allowable rates of change in both the positive and negative directions by comparator circuitry 42. The term "maximum allowable rates of change", as used herein, should be understood as meaning the maximum allowable rate of change before the comparator circuitry begins to generate a non-zero compensation error signal component $E_1$ on line 44. There is no actual restriction on the rate of change of the signal $X_1$ on the line 26 other than the fact that when the rate of change gets too large either in the positive-going or the negative-going direction, a non-zero error signal component $E_1$ will be generated having a magnitude which is proportional to the magnitude of the rate of change of the signal $X_1$ and having a polarity such as to reduce the magnitude of the rate of change of the signal $X_1$.

The comparator circuitry 42 is shown in the embodiment of FIG. 6 as comprised of two differential amplifiers 92 and 94. These differential amplifiers are each coupled as summing amplifiers with one input voltage being the output voltage on line 86 from the differentiator 40 and the other input voltage being an offset voltage. The offset voltage for amplifier 92 is labeled -V1, whereas the offset voltage for the amplifier 94 is labeled +V2. The output voltage from the amplifier 92 is labeled $V_{01}$, whereas the output voltage from the amplifier 94 is labeled $V_{02}$. The expressions for these two output voltages, given in terms of the resistor networks for each amplifier and the input voltages for each amplifier are given in FIG. 6 inside the comparator box labeled 42. It will be noted from study of these equations that the ratios of the feedback resistors R5 and R6 to the input resistors R3, R4, R7, and R8 establish the relative gain applied to each of the two input voltages for each of the amplifiers, thereby allowing the relative effect of each voltage on the output voltage to be altered. It will also be noted that the output of each of the amplifiers 92 and 94 on lines 96 and 98, respectively, are coupled to the virtual ground at the summing junction 20 through a pair of diodes 100 and 102, respectively. Furthermore, each of these diodes is coupled to the summing junction 20 through resistors 104 and 106. These resistors set the gains of the signals on lines 96 and 98 with respect to the signals on lines 10 and 12. It will also be noted by virtue of the polarity of the diodes 100 and 102 versus the polarity for the output voltages on the lines 96 and 98, respectively, that until the input voltage reaches a certain offset level in each case, no current flows in the line 44.

For example, in the case of the diode 100, until the voltage $V_I$ coupled to the inverting inputs of the amplifiers 92 and 94 by line 86 reaches a predetermined positive level, the output voltage $V_{01}$ remains positive with respect to the virtual ground at the summing junction 20. Therefore, the diode 100 prevents any current from flowing as the error signal $E_1$ until the max-plus limit for the input voltage $V_I$ is reached. When this limit is reached, the sign of the output voltage $V_{01}$ changes and becomes negative. This occurs when the rate of change of the signal $X_1$ is negative-going and sufficiently large. When the output voltage $V_{01}$ exceeds the forward bias voltage drop of the diode 100, the amplifier 92 begins to sink current from the summing junction 20, thereby causing current flow in the direction shown by the arrow 108 in line 44. This tends to decrease the buildup of negative voltage on the line 26 caused by a positive error signal on the summing junction 20. A positive voltage on this summing junction causes current flow through the feedback network of the amplifier 66 from left to right. Likewise, when the input voltage $V_I$ reaches the max-minus limit, the voltage on line 98, $V_{02}$, changes sign from negative to positive with respect to the virtual ground at the node 20. This causes the diode 102 to become forward biased, thereby causing current flow in line 44 into the summing junction as illustrated by the arrow 110. This tends to reduce the positive-going rate of change for the signal $X_1$ on the line 26.

Figure 7:
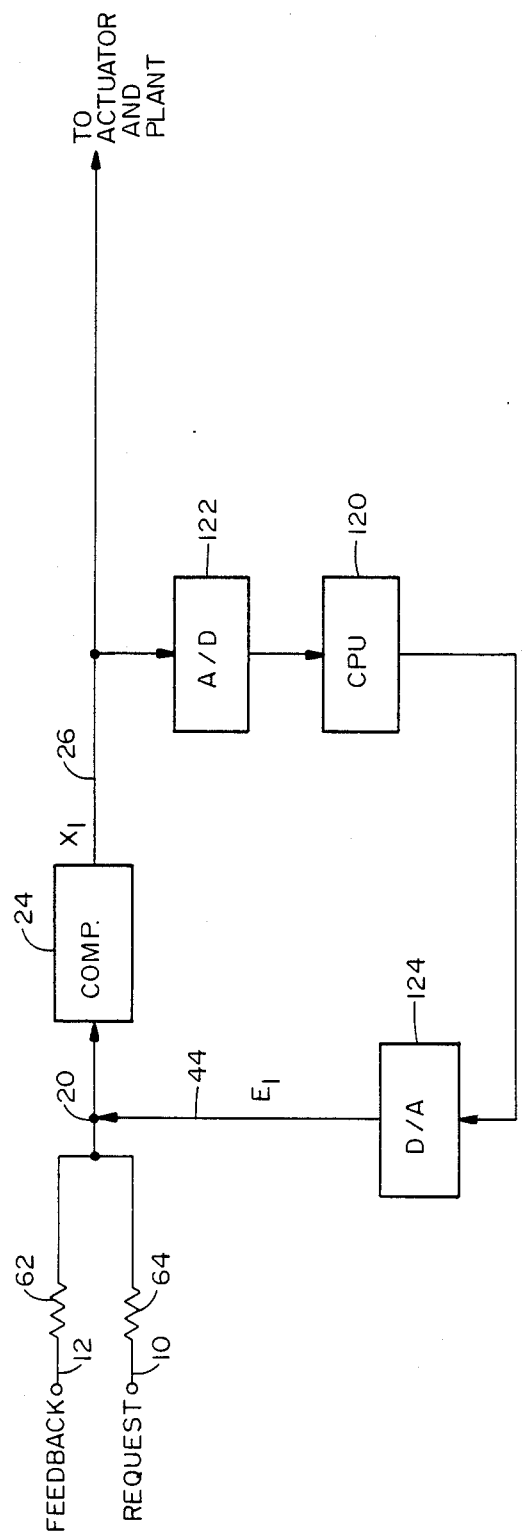
FIG. 7 is a block diagram of a digital embodiment of the invention.

Referring to FIG. 7, there is shown a digital embodiment of the invention. In FIG. 7, circuit elements having the same numbers as corresponding circuit elements in FIG. 6 serve identical functions. The principal difference between the embodiments shown in FIGS. 7 and 6 are that in FIG. 7 a CPU 120 with the aid of an analog-to-digital converter 122 and a digital-to-analog converter 124 perform the differentiation and comparison and generation of the error signal component $E_1$ on line 44 in accordance with a program. This program is illustrated in FIG. 8.

Figure 8:
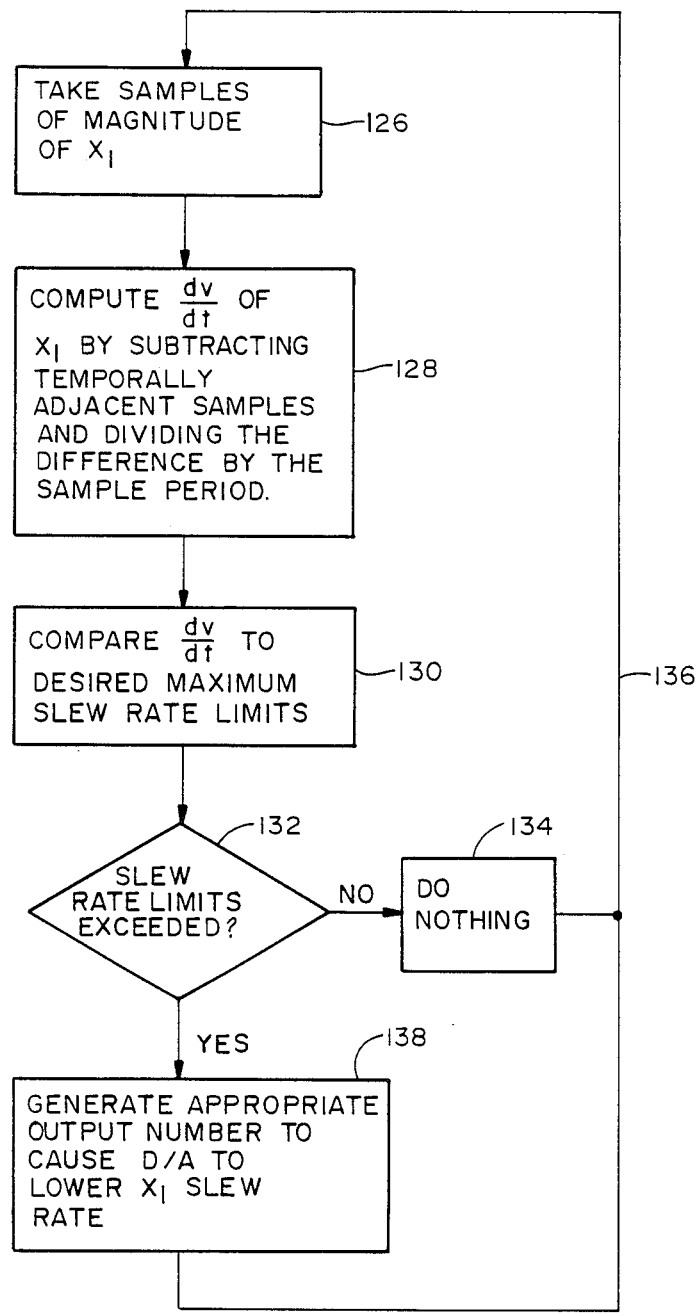
FIG. 8 is a flow chart of the program run by the CPU in the apparatus shown in FIG. 7 to implement the method of the invention.

Referring to FIG. 8, the first step in the program for generating the error signal correction component $E_1$ is to take samples of the magnitude of the signal $X_1$ on line 26. This process is symbolized by the step 126 which represents the process of reading the analog-to-digital converter 122 by the CPU 120 during adjacent sample periods and storing the digital equivalent of magnitude of the signal on line 26 during each sample period in a separate register or memory location. In other embodiments, the compensator may generate a frequency or other signal which is directly measurable by the CPU 120 as is the common practice with some control application type microprocessors which are commercially available. In such an embodiment, the magnitude of the signal on the line 26 may be determined directly by the CPU 120 such that the A/D converter may be eliminated.

Next, the rate of change of the signal $X_1$ is computed as symbolized by step 128. This may be accomplished by subtracting the digital number representing the magnitude of the single signal $X_1$ during adjacent sample periods and dividing the difference by the length of the sample period. If the sample period is constant, the division is not required. For example, if the maximum slew rate is 5 volts per second, with a sample period of 1 millisecond, it is only necessary to see if the difference exceeds 5 volts. Leaving out the division makes the software execute more quickly.

The function of the comparators in FIG. 6 is performed by the step 130, which represents the process of comparing the rate of change of the signal $X_1$ to the desired maximum rates of change or maximum slew rate limits for the signal $X_1$. This may be done by comparing the answers computed in step 128 to maximum slew rate limit constants set by the user and stored in particular memory locations. The next step in the process is to determine whether or not the slew rate limits have been exceeded. This stop is symbolized by the test 132. If the slew rate limits have been exceeded, the step 134 is performed, which is really a no-operation step with a return via path 136 to step 126. If the slew rates have been exceeded, then step 138 is performed. This step symbolized the process of generating the appropriate output number to cause the digital-to-analog converter 124 in FIG. 7 to lower the slew rate of the signal $X_1$. Basically, a digital number will be generated in step 138 and will be output by the CPU 120 in FIG. 7 to the digital-to-analog converter 124 to cause the output voltage on line 44 to go either positive or negative, depending upon which way the slew rate of the signal $X_1$ is to be altered. In embodiments where the compensator 24 is digital, the D/A converter 124 may be eliminated and the output of the CPU may be used directly. Many microprocessors now have pulse width modulation (PWM) outputs. These microprocessors may be used directly with compensators that accept pulse width modulation inputs in conjunction with circuitry that can sum the feedback and request inputs in PWM format and output a difference signal in PWM format.

Figure 9:
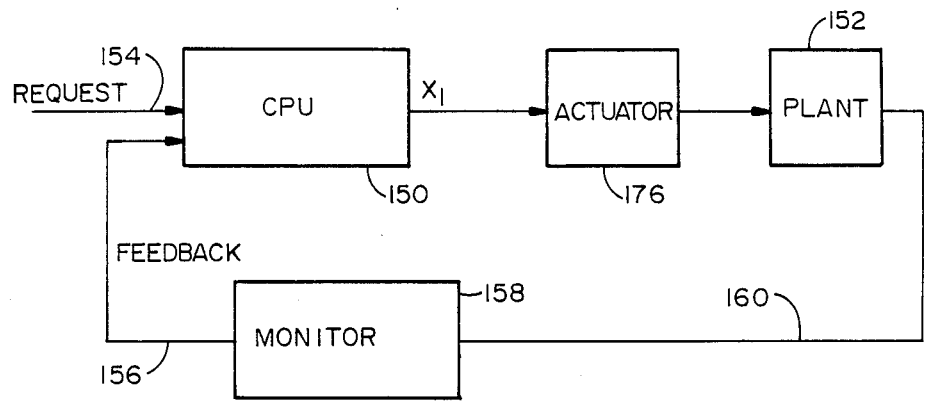
FIG. 9 is a block diagram of an all digital embodiment of the invention.

Referring to FIG. 9, there is shown an all digital embodiment of a system according to the teachings of the invention. A computer 150 receives the requested output level for the plant 152 as a digital Request signal on line 154. The computer 150 also receives a digital Feedback signal on line 156 indicating the level of output from the plant 152. This feedback signal is generated by a monitor 158 which has its input coupled to the output 160 of the plant to sense the plant output. The monitor 158 can be any type of device suitable for sensing the plant output. The monitor may output an analog signal which must combined by suitable circuitry with the digital Request signal. The inverse situation is also possible where the Request signal is analog and the Feedback signal is digital.

Figure 10:
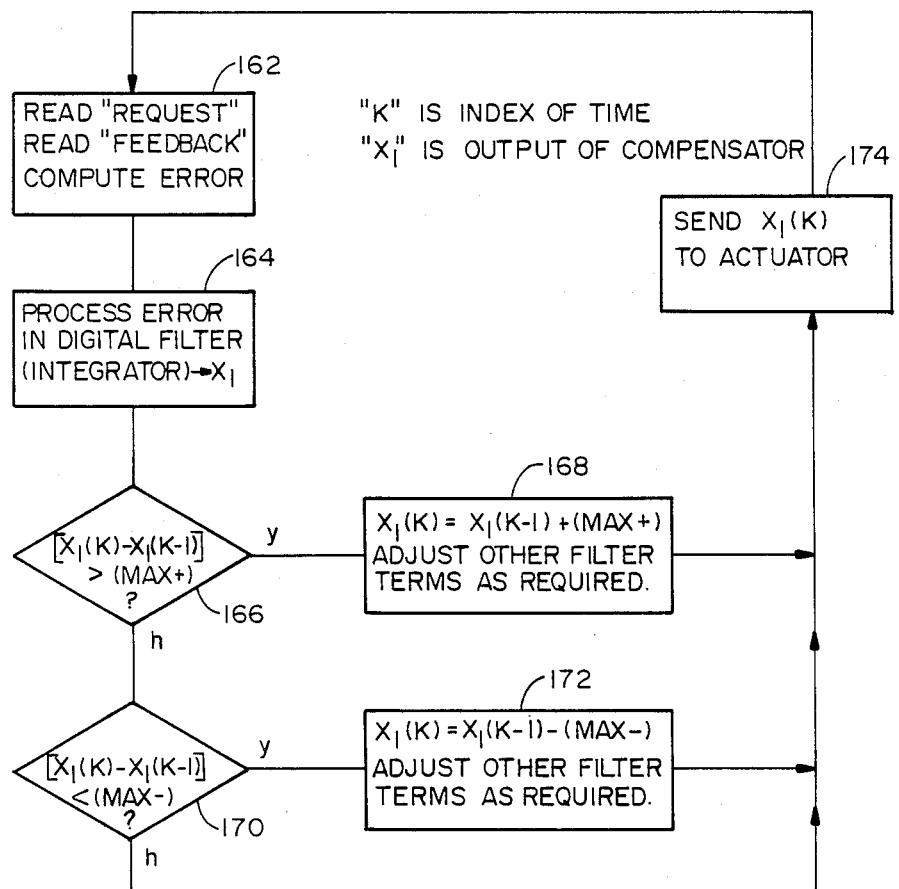
FIG. 10 is a flow chart of a program that the CPU of the system illustrated in FIG. 9 would run to implement the teachings of the invention.

The computer 150 runs a program having the structure shown in FIG. 10 to read the Feedback and Request signals and computes an error signal as symbolized by step 162. This error signal is then processed in a digital filter in the form of an integrator as symbolized by step 164. Step 164 results in the generation of the actuator control signal $X_1$. The test symbolized by block 166 compares the difference between the $X_1$ signals generated during successive time periods to a maximum allowable positive rate of change. If the maximum allowable positive rate of change has been exceeded, step 168 is performed to set the latest $X_1$ signal equal to the next preceding $X_1$ signal plus a constant equal to the maximum allowable positive rate of change.

If the maximum allowable positive rate of change has not been exceeded, test 170 is performed to determine if the difference between the most recent $X_1$ signal and the next previous $X_1$ signal exceeds the maximum allowable negative rate of change. If the maximum allowable negative rate of change has been exceeded, step 172 is performed to set $X_1$ equal to the next most recent $X_1$ signal minus the maximum allowable negative rate of change. If the maximum allowable negative rate of change has not been exceeded, step 174 is performed to output the computed value of the $X_1$ signal resulting from steps 170, 168 or 172 as the case may be for any particular sample period. The $X_1$ signal is the used by an actuator 176 in FIG. 9 to control the plant 152.

FIG. 11 represents another digital embodiment of a system according to the teachings of the invention using an analog front end. In the embodiment of FIG. 11, an analog Reference signal indicating the desired level of plant output is coupled to a summing device 180. The Feedback signal from a monitor coupled to the plant output is also coupled to the summing device 178. The summing device determines the difference between the Reference signal and the Feedback signal and outputs an error signal on line 180 to an analog to digital converter 182. The error signal is converted to a digital number which is coupled to a computer 190. The computer then processes this digital error signal by integrating it. Processing thereafter is identical to the processing shown in FIG. 10.

Although the invention has been described in terms of the preferred and alternate embodiments disclosed herein, those skilled in the art will appreciate numerous modifications which can be made without departing from the spirit and scope of the invention. All such modifications are intended to be included within the scope of the claims appended hereto.

What is claimed is:

1. An apparatus for reducing integrator windup in an integrator of an error signal in a control system having a feedback signal and a command signal which are combined to derive said error signal comprising:

means coupled to the output of said integrator for sensing the rate of change of the output of said integrator; and means for comparing the rate of change of the output of said integrator to a predetermined maximum and for generating a compensation error signal which, when combined with said feedback signal and said command signal tend to change said error signal in such a way that said rate of change of the output of said integrator is reduced.

2. The apparatus of claim 1 wherein said means for comparing is for comparing the rate of change of said integrator output to a first predetermined maximum defining the maximum positive going rate of change before said compensation error signal is generated and is also for comparing the rate of change of said integrator output to a second predetermined maximum defining the maximum negative going rate of change before said compensation error signal is generated.

3. The apparatus of claim 2 wherein said means for sensing the rate of change is a differentiator.

4. The apparatus of claim 3 wherein said means for comparing comprises:

summing means for summing said command input, said error signal and said feedback signal to generate said error signal which is coupled said integrator;

means coupled to said summing means for generating said compensation error signal comprising:

a first differential amplifier having an inverting input, a non inverting input and an output, said non inverting input for coupling to a first reference potential and said output being coupled to said inverting input through a first resistor, said inverting input being coupled to a second reference potential through a second resistor and to the output of said integrator through a third resistor, said output of said being coupled to said summing means through a first diode and a fourth resistor, said first diode having a first polarity with respect to said output of said first differential amplifier; and a second differential amplifier having an inverting input, a non inverting input and an output, said non inverting input of said second differential amplifier for coupling to said first reference potential and said output of said second differential amplifier being coupled to said inverting input through a fifth resistor, said inverting input of said second differential amplifier being coupled to a third reference potential through a sixth resistor and to the output of said integrator through a seventh resistor, said output of said second differential amplifier being coupled to said summing means through a second diode and an eighth resistor, said second diode having a second polarity with respect to said output of said second differential amplifier.

5. The apparatus of claim 1 wherein said means for comparing generates said compensation error signal to have a magnitude of zero until the rate of change of said integrator output reaches said predetermined maximum rate of change and thereafter generates said compensation error signal to increase linearly with increases in the difference between said predetermined maximum rate of change and said rate of change of said integrator output.

6. The apparatus of claim 3 wherein said means for sensing the rate of change is a differentiator.

7. The apparatus of claim 6 wherein said means for comparing comprises:

summing means for summing said command input, said error signal and said feedback signal to generate said error signal which is coupled said integrator;

means coupled to said summing means for generating said compensation error signal comprising:

a first differential amplifier having an inverting input, a non inverting input and an output, said non inverting input for coupling to a first reference potential and said output being coupled to said inverting input through a first resistor, said inverting input being coupled to a second reference potential through a second resistor and to the output of said integrator through a third resistor, said output of said being coupled to said summing means through a first diode and a fourth resistor, said first diode having a first polarity with respect to said output of said first differential amplifier; and a second differential amplifier having an inverting input, a non inverting input and an output, said non inverting input of said second differential amplifier for coupling to said first reference potential and said output of said second differential amplifier being coupled to said inverting input through a fifth resistor, said inverting input of said second differential amplifier being coupled to a third reference potential through a sixth resistor and to the output of said integrator through a seventh resistor, said output of said second differential amplifier being coupled to said summing means through a second diode and an eighth resistor, said second diode having a second polarity with respect to said output of said second differential amplifier.

8. The apparatus of claim 1 wherein said means for comparing generates said compensation error signal to have a magnitude of zero until the rate of change of said integrator output reaches either said predetermined positive or negative maximum rate of change and thereafter generates said compensation error signal to increase linearly and with a first polarity with increases in the difference between said predetermined maximum positive rate of change and said positive rate of change of said integrator output, and generates said compensation error signal to increase linearly and with a second polarity with increases in the difference between said predetermined maximum negative rate of change and said negative rate of change of said integrator output.

9. The apparatus of claim 8 wherein said means for sensing the rate of change is a differentiator.

10. The apparatus of claim 9 wherein said means for comparing comprises:
summing means for summing said command input, said error signal and said feedback signal to generate said error signal which is coupled said integrator;
means coupled to said summing means for generating said compensation error signal comprising:
a first differential amplifier having an inverting input, a non inverting input and an output, said non inverting input for coupling to a first reference potential and said output being coupled to said inverting input through a first resistor, said inverting input being coupled to a second reference potential through a second resistor and to the output of said integrator through a third resistor, said output of said being coupled to said summing means through a first diode and a fourth resistor, said first diode having a first polarity with respect to said output of said first differential amplifier; and
a second differential amplifier having an inverting input, a non inverting input and an output, said non inverting input of said second differential amplifier for coupling to said first reference potential and said output of said second differential amplifier being coupled to said inverting input through a fifth resistor, said inverting input of said second differential amplifier being coupled to a third reference potential through a sixth resistor and to the output of said integrator through a seventh resistor, said output of said second differential amplifier being coupled to said summing means through a second diode and an eighth resistor, said second diode having a second polarity with respect to said output of said second differential amplifier.

11. The apparatus of claim 1 wherein said means for sensing the rate of change is a differentiator.

12. The apparatus of claim 11 wherein said means for comparing comprises:
summing means for summing said command input, said error signal and said feedback signal to generate said error signal which is coupled said integrator;
means coupled to said summing means for generating said compensation error signal comprising:
a first differential amplifier having an inverting input, a non inverting input and an output, said non inverting input for coupling to a first reference potential and said output being coupled to said inverting input through a first resistor, said inverting input being coupled to a second reference potential through a second resistor and to the output of said integrator through a third resistor, said output of said being coupled to said summing means through a first diode and a fourth resistor, said first diode having a first polarity with respect to said output of said first differential amplifier; and
a second differential amplifier having an inverting input, a non inverting input and an output, said non inverting input of said second differential amplifier for coupling to said first reference potential and said output of said second differential amplifier being coupled to said inverting input through a fifth resistor, said inverting input of said second differential amplifier being coupled to a third reference potential through a sixth resistor and to the output of said integrator through a seventh resistor, said output of said second differential amplifier being coupled to said summing means through a second diode and an eighth resistor, said second diode having a second polarity with respect to said output of said second differential amplifier.

13. An apparatus for reducing integrator windup in a control system for an apparatus being controlled comprising:
a feedback input for receiving a feedback signal from said apparatus being controlled indicating the status of said apparatus;
a command input for receiving an input signal representing the desired status of said apparatus being controlled;
a compensation error signal input for receiving a compensation error signal;
a summing junction to which is coupled said feedback input said command input and said compensation error signal input for generating and error signal;
integrator means for integrating said error signal and for generating a control signal for said apparatus being controlled as a result of said integration;
differentiator means for determining the rate of change of said control signal; and
comparison means coupled to said summing means and to said differentiator means for comparing the rate of change of said control signal determined by said differentiator means to predetermined maximum allowable rates of change in the positive going and negative going directions and for generating said compensation error signal in response to said comparison in such a manner to reduce the magnitude of the rate of change of said control signal.

14. An apparatus for reducing windup in an integrator integrating an error signal in a control system having feedback for controlling an apparatus comprising:
digital means for determining the rate of change of the output of said integrator by subtracting the values of successive samples of said integrator output;
digital comparison means for comparing the rate of change of the output of said integrator to predetermined constants and for generating a digital number for use in generation of a compensation error signal;
means for receiving said digital number and for generating therefrom a compensation error signal; and means for combining said compensation error signal with said error signal in such a way that the rate of change of the output of said integrator is reduced.

15. The apparatus of claim 14 wherein said digital means and said digital comparison means are a programmed computer.

16. The apparatus of claim 15 wherein said means for receiving is an analog to digital converter.

17. The apparatus of claim 16 wherein said means for combining is a summing amplifier having an input coupled to an output of said amplifier by an impedance including a capacitive element, said input also coupled to receive a command signal indicating the desired control level, a feedback signal indicating the actual control level and coupled to said compensation error signal.

18. An apparatus for preventing windup in a digital control system for a plant comprising:
   means for monitoring the output of said plant and for generating a feedback signal indicative of the output of said plant;
   an input for receiving a request signal indicating the desired level for the output of said plant;
   means for comparing said request signal to said feedback signal to generate an error signal and integrate said error signal to generate a preliminary plant control signal; and
   means for determining the rate of change of said preliminary plant control signal and for comparing the rate of change of said preliminary plant control signal to maximum allowable rates of change in the positive and negative direction and for correcting said preliminary plant control signal to generate a final plant control signal having a different rate of change which will not cause windup and for using said final plant control signal to control said plant.

19. A method of reducing integrator windup in a control system including an integrator for integrating an error signal comprising the steps of:
   determining the rate of change of the output of said integrator;
   comparing the rate of change of said output to a predetermined maximum desired rate of change;
   generating a compensation error signal if said predetermined maximum desired rate of change has been exceeded; and
   combining said compensation error signal with said error signal in such a way as to reduce the rate of change of the output of said integrator.

* * * * *